United States Patent Office 3,714,152
Patented Jan. 30, 1973

3,714,152
ARYLVINYL-v-TRIAZOLES, THEIR USE FOR THE OPTICAL BRIGHTENING OF ORGANIC MATERIALS AND PROCESS FOR THEIR PRODUCTION
Hans Schlapfer, Basel, Switzerland, assignor to Ciba-Geigy Corporation, Basel, Switzerland
No Drawing. Filed June 4, 1970, Ser. No. 43,567
Claims priority, application Switzerland, June 13, 1969, 9,055/69
Int. Cl. C07d 55/02
U.S. Cl. 260—240 D                                1 Claim

ABSTRACT OF THE DISCLOSURE

New 2-[3-phenylcoumarinyl-(7)]-4-styryl-5-chloro-v-triaboles are brighteners of high-molecular organic materials. The compounds are obtained by oxidative ring closure of isonitrosobenzalacetone-[-phenyl-coumarinyl-(7)]-hydrazone and reacting the resultant v-triazole-1-oxide with hydrogen chloride.

DESCRIPTION OF INVENTION

The present invention relates to new v-triazoles substituted by chlorine in the 3-position and substituted in the 4-position by an arylvinyl group and containing, in the 2-position, a coumarinyl-(7)-group substituted in the 3-position, also to the use of these compounds for the optical brightening of synthetic and natural organic materials as well as in processes for the production of the compounds.

3-phenyl-coumarins containing in the 7-position a further substituted v-triazole group have already been suggested as optical brighteners. Some of them, e.g. the compounds substituted by a 4,5-areno-v-triabolyl-(2) group, produce undesirable greenish white effects or possess too strong a yellow inherent colour and have, moreover, relatively poor fastness to light in that they turn yellow after prolonged exposure to light. On the other hand, the new compounds are distinguished, compared to known 1-v-triazolyl-(2)-coumarins substituted in the triazole ring by alkyl, aralkyl or aryl groups, by a particularly high molecular extinction and a therewith associated very high degree of whiteness of the brightened material. It could not be assumed beforehand that fluorescent compounds usable as optical brighteners are obtained by the introduction of an arylvinyl group into the prior known triazolylcoumarin derivatives, since usually the light absorption of aromatic systems is appreciably displaced towards longer wave lengths by the styryl group. On account of their absorption in the visible range of the spectrum, fluorescent compounds with too much long-wave absorption can no longer be used as optical brighteners. The attained sudden improvement of the brightening effect was therefore not to be anticipated and is surprising.

The new arylvinyl-v-triazoles of the coumarin series correspond to the Formula I,

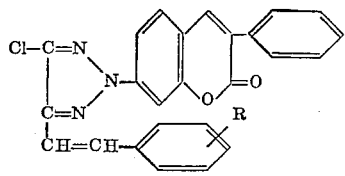

(I)

wherein R represents hydrogen, chlorine or an alkyl group having 1 to 4 carbon atoms, in particular methyl.

The compounds according to the invention are distinguished by good compatibility with high-molecular organic substances. The new optical brighteners are suitable for the brightening of high-molecular materials such as polyolefins, e.g. polyethylene or polypropylene, also polyvinyl chloride, particularly, however, polyesters, especially polyesters of aromatic polycarboxylic acids with polyvalent alcohols such as polyterephthalic acid glycol ester, synthetic polyamides such as nylon-6 and nylon-66, but also cellulose esters such as cellulose acetates, and also for the brightening of cellulose.

The optical brightening of the high-molecular, colourless, organic material is performed, for example, by incorporating into this material small amounts of optical brighteners according to the invention, preferably 0.001 to 1% relative to the material to be brightened, optically together with other additives such as softeners, stabilisers or pigments. The brighteners can be worked into the synthetic materials, e.g. dissolved in softeners such as dioctylphthalate, or together with stabilisers such as dibutyl tin laurate or sodium pentaoctyl tripolyphosphate, or together with pigments such as, e.g. titanium dioxide. Depending on the nature of the material to be brightened, the brightener may also be dissolved in the monomers before polymerisation, in the polymer mass, or together with the polymers in a solvent. The material pre-treated in this manner is afterwards processed into the desired ultimate form by methods known per se, such as calendering, pressing, extrusion, coating, moulding and, in particular, by spinning and stretching. The brighteners can also be worked into finishings, e.g. into finishings for textile fibres such as polyvinyl alcohol, or into resins or resin precondensates such as, e.g. methylol compounds of ethylene urea, which are used for the treatment of textiles.

Preferably, colourless, high-molecular, organic material is brightened also in the form of fibres. For the brightening of these fibre materials, a dispersion or solution of v-triazoles of the Formula I according to the invention is advantageously used. The brightener dispersion or solution preferably has a content of 0.005–0.5% of v-triazole according to the invention, relative to the fibre material. In addition, the dispersion or solution can contain auxiliaries such as dispersing agents, e.g. condensation products of fatty alcohols or alkyl phenols containing 10 to 18 carbon atoms, with 15 to 25 moles of ethylene oxide, or condensation products of alkylmono- or polyamines containing 16 to 18 carbon atoms, with, at least, 10 moles of ethylene oxide, organic acids such as formic, oxalic or acetic acid, detergents, swelling agents such as di- or trichlorobenzenes, wetting agents such as sulphosuccinic acid alkyl ester, bleaching agents such as sodium chlorite, peroxides or hydrosulphites, as well as, optionally, brightening agents of other classes such as, e.g. derivatives of stilbene having affinity to cellulose.

The brightening of the fibre material with the aqueous brightener-treatment-bath is carried out either by the exhaust process, at temperatures of preferably 30 to 150° C., or by the padding process. In the latter case, the material is impregnated, e.g. with a 0.2–0.5% brightener preparation, and finished, e.g. by a dry or moist heat treatment, e.g. by steaming under 2 atmospheres pressure or, after a drying treatment, by a short dry heating to 180–220° C., whereby the fabric is simultaneously thermofixed. The thus treated fibre material is finally rinsed and dried.

Colourless, high-molecular, organic material optically brightened according to the invention, particularly the synthetic fibre material brightened in the exhaust process, has a pleasing, pure white, blue-violet to bluish fluorescent appearance; such material dyed in light shades and brightened according to the invention is distinguished by a pure shade.

The v-triazoles of the Formula I according to the invention can also be added to detergents and these used for the brightening of textiles.

The content of optical brightener in the detergents is advantageously 0.001–0.5%, relative to the solid content in the detergent.

Washing liquors containing v-triazoles of the Formula I according to the invention impart, during washing, to the textile fibres treated therewith, e.g. cellulose fibres or synthetic polyamide, polyester, polyolefin and cellulose ester fibres, a brilliant appearance in daylight. They can be used therefore, in particular, for the washing of these synthetic fibres or of the textiles or component parts of textiles made from such fibres, or for the washing of household laundry.

The compounds of Formula I are obtained by oxidatively producing ring closure in a compound of the Formula II or II',

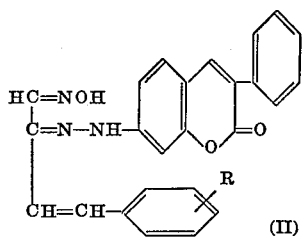

or

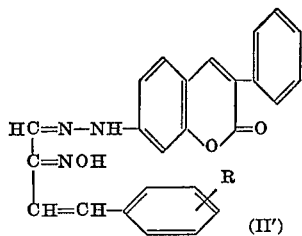

and reacting the resultant v-triazole-1-oxide with hydrogen chloride to form a compound of the Formula I, whereby, with simultaneous reduction of the oxide to the v-triazole ring, a chlorine atom is introduced into the 3-position of this ring. This reaction is advantageously performed with gaseous hydrogen chloride which, at reflux temperature, is fed into a mixture of a water-soluble organic solvent in water, wherein the v-triazole oxide is dispersed. These chlorine-containing compounds can also be produced by reaction of the v-triazole oxide with sulphonyl chloride and subsequent reduction with nascent hydrogen, e.g. by means of zinc dust and glacial acetic acid, to the 3-chloro-v-triazole compound.

Oxidative ring closure can be effected by the action of the most diverse oxidising agents, whereby it is advisable to operate in solvents which are resistant to oxidation. In acid solution, e.g. acetic acid solution, bichromate or hydrogen peroxide are suitable oxidising agents; in basic solvents, such as pyridine or pyridine/water mixtures, potassium ferricyanide is, for example, suitable. The generally applicable and therefore preferred process consists in oxidation with copper-(II)-sulphate in pyridine/water. It is not necessary thereby for stoichiometric amounts of copper to be used, since the monovalent copper formed during the reaction can be continually converted, by the blowing in of air or oxygen, again into the bivalent stage.

The starting materials for the production process according to the invention can be obtained in a known manner.

In the following example, the temperatures are given in degrees centigrade.

EXAMPLE

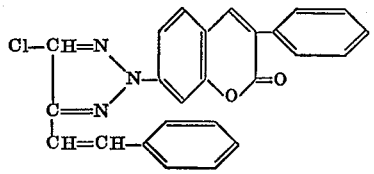

2-[3-phenylcoumarinyl-(7)]-4-styryl-5-chloro-v-triazole 19.6 g. of isonitrosobenzalacetone are added at room temperature to a suspension of 25.2 g. of 3-phenyl-7-hydrazinocoumarin in a mixture of 800 ml. of methanol and 200 ml. of 50% acetic acid, and the reaction mixture is then stirred for 5 hours at 50–55°. The initially dirty yellow suspension hereby rapidly changes into the deep orange-red coloured, fine-crystalline isonitrosobenzalacetone - [3 - phenylcoumarinyl-(7)]-hydrazone. After cooling, the precipitate is filtered off under suction, washed with methanol and dried in vacuo at 60–70°. In this manner are obtained 35.6 g. of crude isonitrosobenzalacetone - [3 - phenylcoumarinyl - (7)]-hydrazone, M.P. 208–210°, with decomposition.

To a solution of 30.6 g. of isonitrosobenzalacetone-[3 - phenylcoumarinyl - (7)] - hydrazone in 325 ml. of pyridine is added dropwise at 95–100°, in the course of 45 minutes, a solution of tetrapyridine copper-II-sulphate produced from 38.2 g. of copper sulphate pentahydrate, dissolved in 80 ml. of water, by the addition of 40 ml. of pyridine. The reaction mixture is afterwards stirred for a further 2½ hours at 95–100°, cooled and the precipitated crystal mass filtered off, washed with dioxane, and recrystallised twice from dimethylformamide. In this manner are obtained 12.5 g. of 2 - [3-phenylcoumarinyl-(7)] - 4 - styryl-v-triazole-1-oxide in the form of light-orange coloured crystals, M.P. 273–276°, with decomposition.

When the isonitrosobenzalacetone is replaced by isonitrosobenzalacetone compounds which are substituted in the benzene ring by chlorine or methyl, compounds are obtained which have similar properties.

10.0 g. of 2 - [3 - phenylcoumarinyl-(7)]-4-styryl-v-triazole-1-oxide in a mixture of 500 ml. of dioxane and 50 ml. of water are brought to reflux temperature. Hydrochloric acid gas is introduced for 5 hours at the boiling temperature, and the reaction mixture is then cooled. The obtained crystalline precipitate is filtered off under suction, and washed with methanol. After a recrystallisation from chlorobenzene with bleaching earth, 2 - [3-phenylcoumarinyl - (7)] - 4 - styryl - 5 - chloro-v-triazole is obtained in the form of light-yellow crystals, M.P. 207–208°, which dissolve in chlorobenzene with an intensely blue-violet fluorescene. The compound imparts to fibres made from polyesters, polyamides, 2½-acetate, triacetate and polypropylene, a brilliant white effect. It can also be added with great success to spinning masses.

What is claimed is:
1. A compound of the formula:

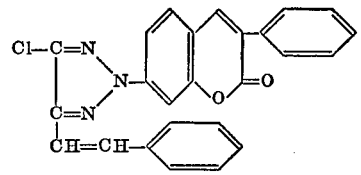

References Cited

Netherlands published application, No. 6800021, pages 1, 1a, 2–4, 10–15 and 1 dwg relied upon, published July 8, 1968.

JOHN D. RANDOLPH, Primary Examiner

U.S. Cl. X.R.

106—176; 117—33.5 T; 252—301.2 W, 543; 260—37 P, 41 C, 45.75 K, 75 R, 78 N, 94.7 R, 94.9 GD, 24 OG, 24 OR